(12) United States Patent
Tseng et al.

(10) Patent No.: US 10,948,698 B2
(45) Date of Patent: Mar. 16, 2021

(54) LENS ASSEMBLY

(71) Applicants: Sintai Optical (Shenzhen) Co., Ltd., ShenZhen (CN); Asia Optical Co., Inc., Taichung (TW)

(72) Inventors: Ming-Huang Tseng, Taichung (TW); Hsi-Ling Chang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 327 days.

(21) Appl. No.: 16/125,812

(22) Filed: Sep. 10, 2018

(65) Prior Publication Data

US 2019/0278067 A1  Sep. 12, 2019

(30) Foreign Application Priority Data

Mar. 6, 2018  (CN) .......................... 201810182652.X

(51) Int. Cl.
*G02B 9/60* (2006.01)
*G02B 13/18* (2006.01)

(52) U.S. Cl.
CPC ............... *G02B 13/18* (2013.01); *G02B 9/60* (2013.01)

(58) Field of Classification Search
CPC ...... G02B 13/18; G02B 9/60; G02B 13/0045; G02B 13/06
See application file for complete search history.

(56) References Cited

U.S. PATENT DOCUMENTS

2012/0162769 A1* 6/2012 Suzuki ............... G02B 13/0045
359/558

* cited by examiner

*Primary Examiner* — Joseph P Martinez
(74) *Attorney, Agent, or Firm* — McClure, Qualey & Rodack, LLP

(57) ABSTRACT

A lens assembly includes a first lens, a second lens, a third lens, a fourth lens and a fifth lens are arranged in order from an object side to an image side along an optical axis. The first lens has negative refractive power. The second lens has positive refractive power. The third lens has negative refractive power and includes a convex surface facing the image side. The fourth lens has positive refractive power and includes a concave surface facing the object side. The fifth lens has positive refractive power and includes a concave surface facing the image side.

18 Claims, 14 Drawing Sheets

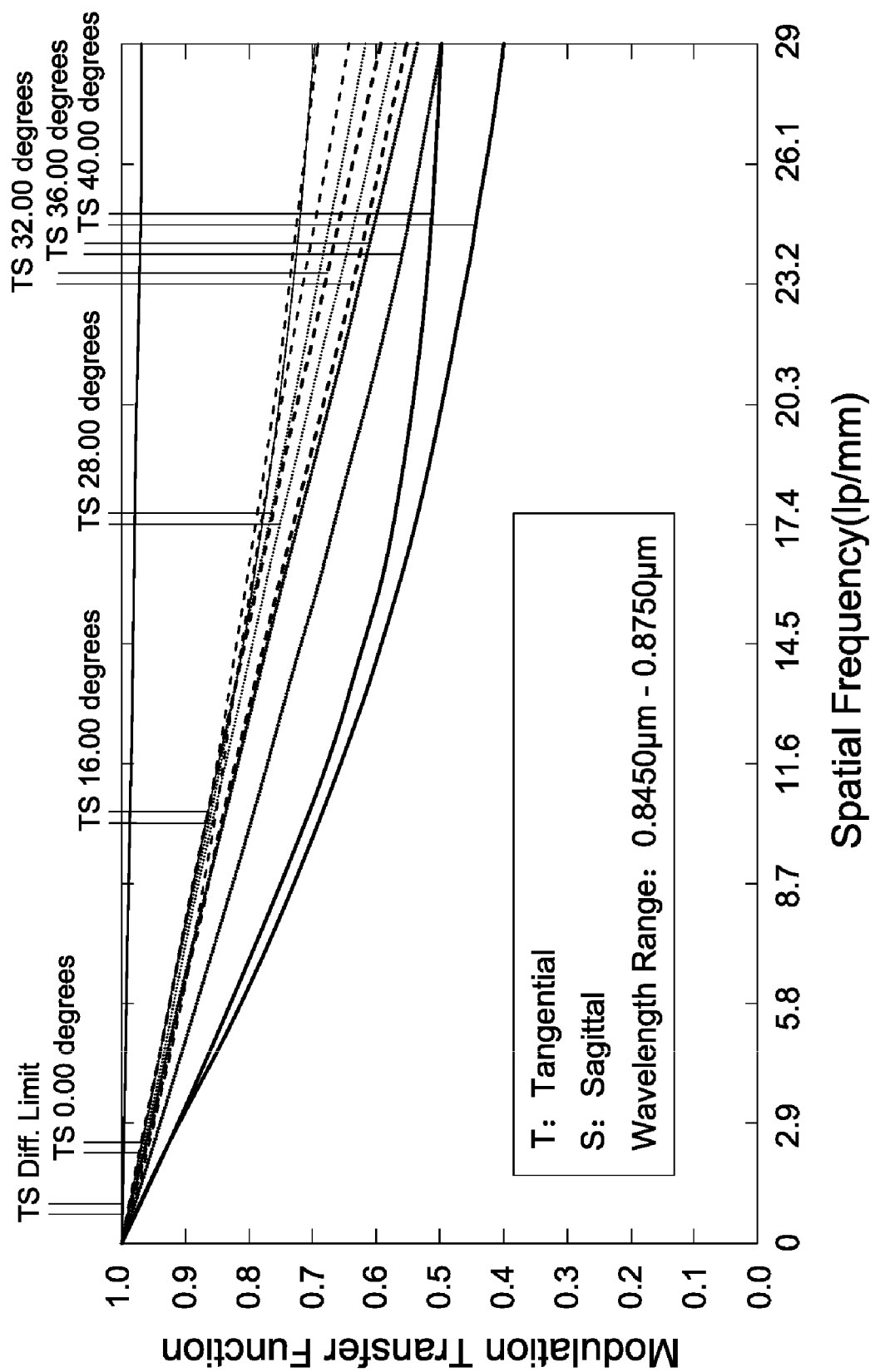

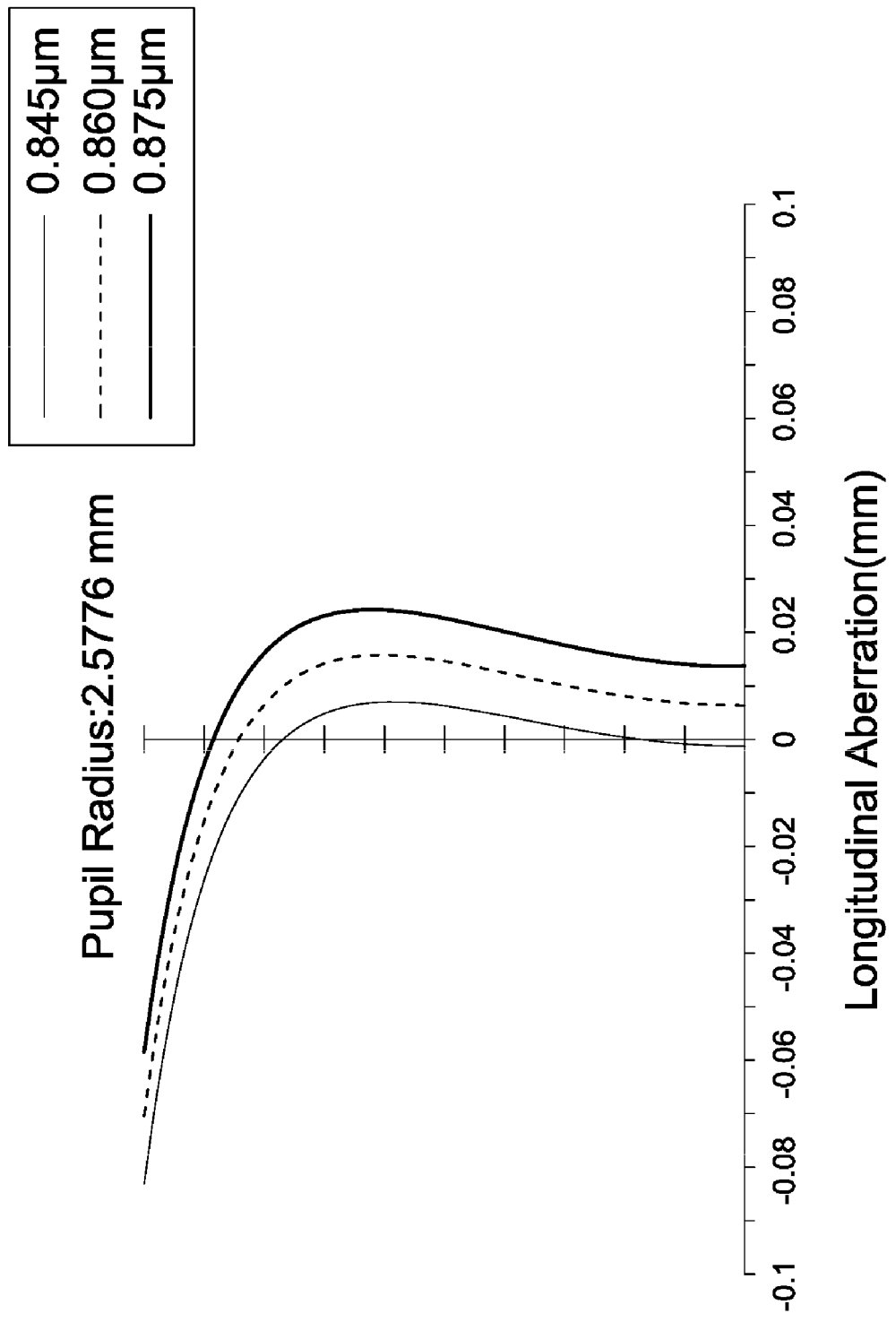

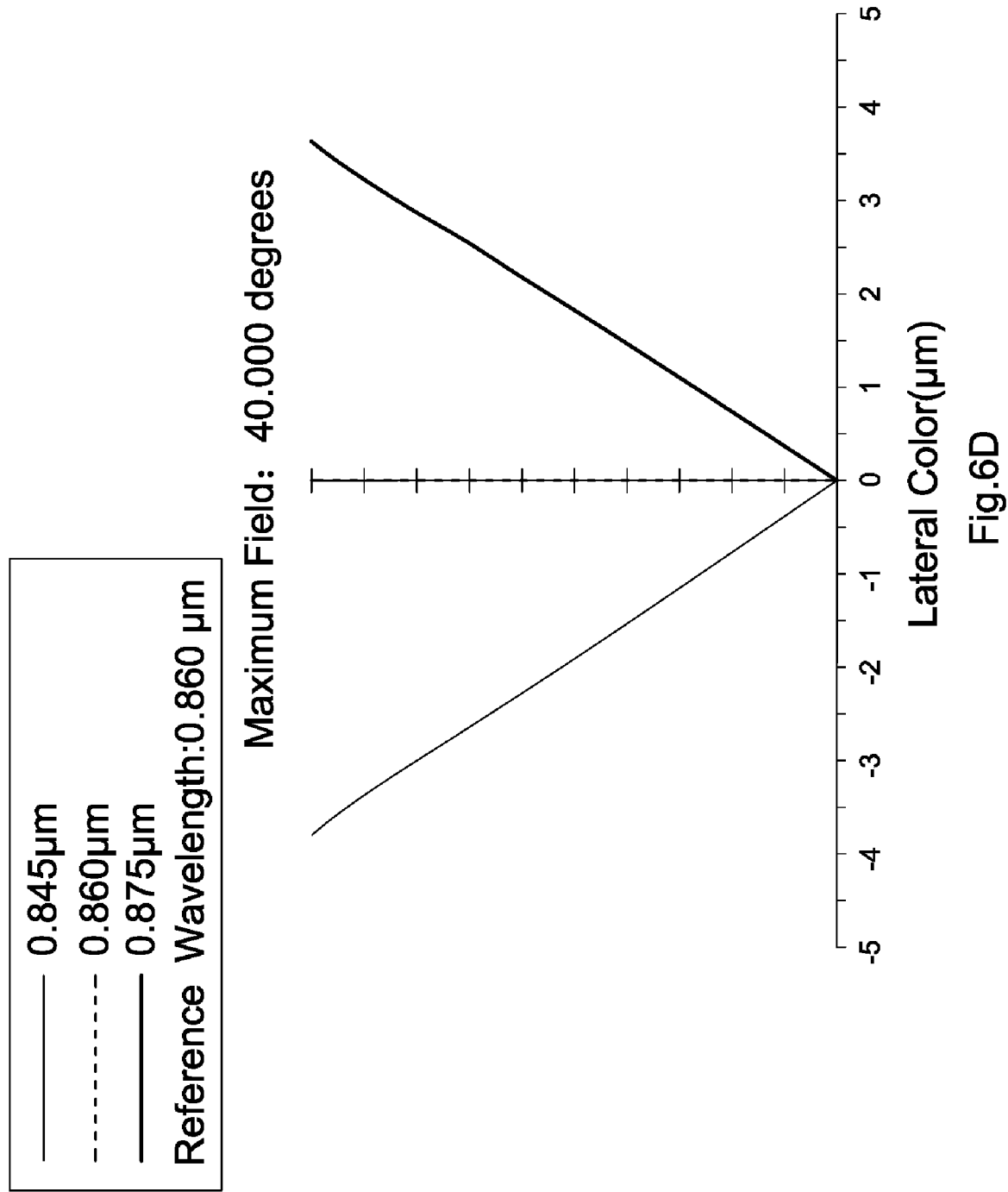

LENS ASSEMBLY

BACKGROUND OF THE INVENTION

Field of the Invention

The invention relates to a lens assembly.

Description of the Related Art

The current development trend of a lens assembly is toward large field of view. Additionally, the lens assembly is developed to have large aperture and high resolution capability in accordance with different application requirements. However, the known lens assembly can't satisfy such requirements. Therefore, the lens assembly needs a new structure in order to meet the requirements of large field of view, large aperture, and high resolution at the same time.

BRIEF SUMMARY OF THE INVENTION

The invention provides a lens assembly to solve the above problems. The lens assembly of the invention is provided with characteristics of a larger field of view, a larger aperture, a higher resolution, and still has a good optical performance.

The lens assembly in accordance with an exemplary embodiment of the invention includes a first lens, a second lens, a third lens, a fourth lens and a fifth lens, wherein the first lens, the second lens, the third lens, the fourth lens and the fifth lens are arranged in order from an object side to an image side along an optical axis. The first lens has negative refractive power. The second lens has positive refractive power. The third lens has negative refractive power and includes a convex surface facing the image side. The fourth lens has positive refractive power and includes a concave surface facing the object side. The fifth lens has positive refractive power and includes a concave surface facing the image side.

In accordance with the invention, the third lens further includes a concave surface facing the object side and the fourth lens further includes a convex surface facing the image side.

In accordance with the invention, the lens assembly satisfies: $-4<(R_{31}+R_{32})/(R_{31}-R_{32})<-2$, wherein $R_{31}$ is a radius of curvature of the object side surface of the third lens and $R_{32}$ is a radius of curvature of the image side surface of the third lens.

In accordance with the invention, the lens assembly satisfies: $0<(R_{31}+R_{32})/(R_{41}+R_{42})<1$, wherein $R_{31}$ is a radius of curvature of the object side surface of the third lens, $R_{32}$ is a radius of curvature of the image side surface of the third lens, $R_{41}$ is a radius of curvature of the object side surface of the fourth lens, and $R_{42}$ is a radius of curvature of the image side surface of the fourth lens.

In accordance with the invention, the lens assembly further includes a stop disposed between the first lens and the second lens, wherein the first lens includes a convex surface facing the object side and a concave surface facing the image side, the second lens is a biconvex lens, and the fifth lens further includes a convex surface facing the object side.

In accordance with the invention, the lens assembly satisfies: $1.8<(Nd_1+Nd_4)/2<1.9$, wherein $Nd_1$ is a refractive index of the first lens and $Nd_4$ is a refractive index of the fourth lens.

In accordance with the invention, the fourth lens is an aspheric lens and without inflection point.

In accordance with the invention, the lens assembly satisfies: $-3<f_1+f_2<-1$, $-2.9<R_{21}/R_{31}<-1.9$, wherein $f_1$ is an effective focal length of the first lens, $f_2$ is an effective focal length of the second lens, $R_{21}$ is a radius of curvature of the object side surface of the second lens, and $R_{31}$ is a radius of curvature of the object side surface of the third lens.

In accordance with the invention, the lens assembly satisfies: $4<(f_4-f_3)/f<10$, wherein $f_3$ is an effective focal length of the third lens, $f_4$ is an effective focal length of the fourth lens, and f is an effective focal length of the lens assembly.

In accordance with the invention, the lens assembly satisfies: $1.7<f_4/f<6$, wherein $f_4$ is an effective focal length of the fourth lens and f is an effective focal length of the lens assembly.

The lens assembly in accordance with an exemplary embodiment of the invention includes a first lens, a second lens, a third lens, a fourth lens and a fifth lens, wherein the first lens, the second lens, the third lens, the fourth lens and the fifth lens are arranged in order from an object side to an image side along an optical axis. The first lens has negative refractive power. The second lens has positive refractive power. The third lens has negative refractive power. The fourth lens has positive refractive power and includes a concave surface facing the object side. The fifth lens has positive refractive power and includes a concave surface facing the image side. The lens assembly satisfies: $4<(f_4-f_3)/f<10$, wherein $f_3$ is an effective focal length of the third lens, $f_4$ is an effective focal length of the fourth lens, and f is an effective focal length of the lens assembly.

In accordance with the invention, the third lens includes a concave surface facing the object side and a convex surface facing the image side, the fourth lens further includes a convex surface facing the image side, and the fifth lens further includes a convex surface facing the object side.

In accordance with the invention, the fourth lens is an aspheric lens and without inflection point.

In accordance with the invention, the lens assembly further includes a stop disposed between the first lens and the second lens, wherein the first lens includes a convex surface facing the object side and a concave surface facing the image side, and the second lens is a biconvex lens.

In accordance with the invention, the lens assembly satisfies: $-4<(R_{31}+R_{32})/(R_{31}-R_{32})<-2$, wherein $R_{31}$ is a radius of curvature of the object side surface of the third lens and $R_{32}$ is a radius of curvature of the image side surface of the third lens.

In accordance with the invention, the lens assembly satisfies: $0<(R_{31}+R_{32})/(R_{41}+R_{42})<1$, wherein $R_{31}$ is a radius of curvature of the object side surface of the third lens, $R_{32}$ is a radius of curvature of the image side surface of the third lens, $R_{41}$ is a radius of curvature of the object side surface of the fourth lens, and $R_{42}$ is a radius of curvature of the image side surface of the fourth lens.

In accordance with the invention, the lens assembly satisfies: $1.8<(Nd_1+Nd_4)/2<1.9$, wherein $Nd_1$ is a refractive index of the first lens and $Nd_4$ is a refractive index of the fourth lens.

In accordance with the invention, the lens assembly satisfies: $1.7<f_4/f<6$, wherein $f_4$ is an effective focal length of the fourth lens and f is an effective focal length of the lens assembly.

In accordance with the invention, the lens assembly satisfies: $-3<f_1+f_2<-1$, wherein $f_1$ is an effective focal length of the first lens and $f_2$ is an effective focal length of the second lens.

In accordance with the invention, the lens assembly satisfies: $-2.9<R_{21}/R_{31}<-1.9$, wherein $R_{21}$ is a radius of curvature of the object side surface of the second lens and $R_{31}$ is a radius of curvature of the object side surface of the third lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2C is a modulation transfer function diagram of the lens assembly in accordance with the first embodiment of the invention;

FIG. 6A depicts a longitudinal aberration diagram of the lens assembly in accordance with the third embodiment of the invention;

FIG. 6D is a lateral color diagram of the lens assembly in accordance with the third embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
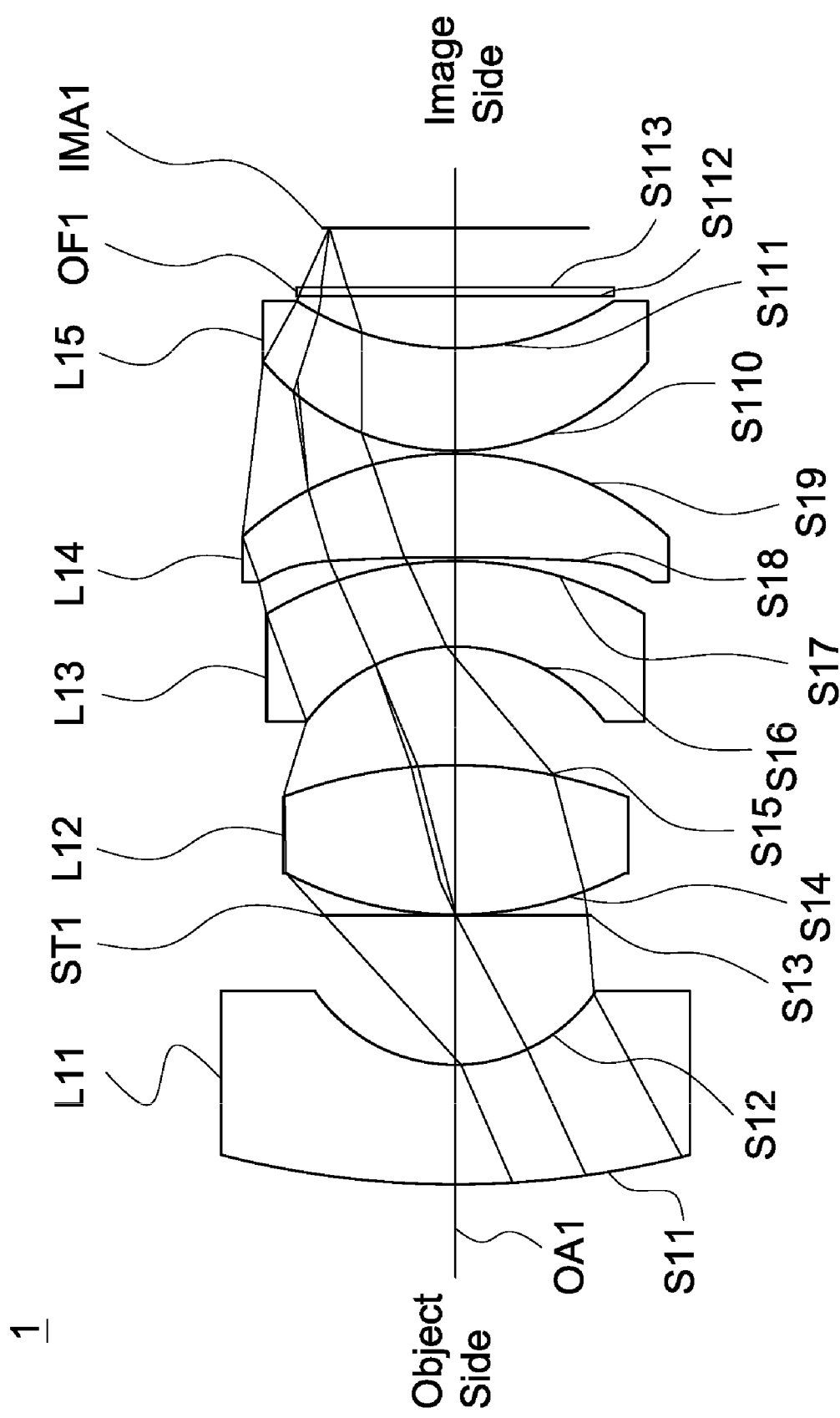
FIG. 1 is a lens layout and optical path diagram of a lens assembly in accordance with a first embodiment of the invention.

Referring to FIG. 1, FIG. 1 is a lens layout and optical path diagram of a lens assembly in accordance with a first embodiment of the invention. The lens assembly 1 includes a first lens L11, a stop ST1, a second lens L12, a third lens L13, a fourth lens L14, a fifth lens L15 and an optical filter OF1, all of which are arranged in order from an object side to an image side along an optical axis OA1. In operation, an image of light rays from the object side is formed at the image plane IMA1.

The first lens L11 is a meniscus lens with negative refractive power and made of glass material, wherein the object side surface S11 is a convex surface, the image side surface S12 is a concave surface, and both of the object side surface S11 and image side surface S12 are spherical surfaces.

The second lens L12 is a biconvex lens with positive refractive power and made of glass material, wherein the object side surface S14 is a convex surface, the image side surface S15 is a convex surface, and both of the object side surface S14 and image side surface S15 are spherical surfaces.

The third lens L13 is a meniscus lens with negative refractive power and made of glass material, wherein the object side surface S16 is a concave surface, the image side surface S17 is a convex surface, and both of the object side surface S16 and image side surface S17 are spherical surfaces.

The fourth lens L14 is a meniscus lens with positive refractive power and made of glass material, wherein the object side surface S18 is a concave surface, the image side surface S19 is a convex surface, and both of the object side surface S18 and image side surface S19 are aspheric surfaces and without inflection point.

The fifth lens L15 is a meniscus lens with positive refractive power and made of glass material, wherein the object side surface S110 is a convex surface, the image side surface S111 is a concave surface, and both of the object side surface S110 and image side surface S111 are spherical surfaces.

Both of the object side surface S112 and image side surface S113 of the optical filter OF1 are plane surfaces.

In addition, the lens assembly 1 of the first embodiment at least satisfies one of the following conditions:

$$1.7 < fl_4/fl < 6 \quad (1)$$

$$-3 < fl_1 + fl_2 < -1 \quad (2)$$

$$4 < (fl_4 - fl_3)/fl < 10 \quad (3)$$

$$-2.9 < R1_{21}/R1_{31} < -9 \quad (4)$$

$$-4 < (R1_{31} + R1_{32})/(R1_{31} - R1_{32}) < -2 \quad (5)$$

$$0 < (R1_{31} + R1_{32})/(R1_{41} + R1_{42}) < 1 \quad (6)$$

wherein $fl_1$ is an effective focal length of the first lens L11, $fl_2$ is an effective focal length of the second lens L12, $fl_3$ is an effective focal length of the third lens L13, $fl_4$ is an effective focal length of the fourth lens L14, $fl$ is an effective focal length of the lens assembly 1, $R1_{21}$ is a radius of curvature of the object side surface S14 of the second lens L12, $R1_{31}$ is a radius of curvature of the object side surface S16 of the third lens L13, $R1_{32}$ is a radius of curvature of the image side surface S17 of the third lens L13, $R1_{41}$ is a radius of curvature of the object side surface S18 of the fourth lens L14, and $R1_{42}$ is a radius of curvature of the image side surface S19 of the fourth lens L14.

By the above design of the lenses and stop ST1, and satisfies at least one of the conditions (1)-(6), the lens assembly 1 is provided with an effective decreased F-number, an effective increased field of view, an effective increased resolution, and an effective corrected aberration.

In order to achieve the above purposes and effectively enhance the optical performance, the lens assembly 1 in accordance with the first embodiment of the invention is provided with the optical specifications shown in Table 1, which include the effective focal length, F-number, total lens length, field of view, radius of curvature of each lens surface, thickness between adjacent surface, refractive index of each lens and Abbe number of each lens. Table 1 shows that the effective focal length is equal to 5.454 mm, F-number is equal to 1.01, total lens length is equal to 30.01124 mm, and field of view is equal to 84 degrees for the lens assembly 1 of the first embodiment of the invention.

TABLE 1

Effective Focal Length = 5.454 mm  F-number = 1.01
Total Lens Length = 30.01124 mm  Field of View = 84 degrees

| Surface Number | Radius of Curvature (mm) | Thickness (mm) | Nd | Vd | Remark |
|---|---|---|---|---|---|
| S11 | 30.21962 | 3.78 | 1.743198 | 49.295578 | The First Lens L11 |
| S12 | 5.371426 | 4.666 | | | |
| S13 | ∞ | 0.01 | | | Stop ST1 |
| S14 | 11.35702 | 4.699 | 1.903658 | 31.315013 | The Second Lens L12 |
| S15 | −15.02745 | 3.736 | | | |
| S16 | −5.851768 | 2.707 | 1.743198 | 49.295578 | The Third Lens L13 |
| S17 | −10.86426 | 0.075 | | | |
| S18 | −12.57332 | 3.286 | 1.902699 | 31.005320 | The Fourth Lens L14 |
| S19 | −9.392634 | 0.05 | | | |
| S110 | 7.815768 | 3.273 | 1.903658 | 31.315013 | The Fifth Lens L15 |
| S111 | 9.040371 | 1.602 | | | |
| S112 | ∞ | 0.3 | 1.5168 | 64.167336 | Optical Filter OF1 |
| S113 | ∞ | 1.827236 | | | |

The aspheric surface sag z of each lens in Table 1 can be calculated by the following formula:

$$z = ch^2 / \{1 + [1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C and D are aspheric coefficients.

In the first embodiment, the conic constant k and the aspheric coefficients A, B, C, D of each surface are shown in Table 2.

TABLE 2

| Surface Number | k | A | B | C | D |
|---|---|---|---|---|---|
| S18 | 0 | 0.039407931 | −0.00030904243 | 6.102441E−06 | −2.5934805E−07 |
| S19 | −0.3315898 | 0.0046565141 | 1.4245587E−05 | 2.0831128E−06 | −1.0512145E−07 |

Table 3 shows the parameters and condition values for conditions (1)-(6). As can be seen from Table 3, the lens assembly 1 of the first embodiment satisfies the conditions (1)-(6).

TABLE 3

| | | | | | |
|---|---|---|---|---|---|
| $fl_1$ | −9.39942 mm | $fl_2$ | 7.819136 mm | $fl_3$ | −22.17059 mm |
| $fl_4$ | 27.6024 mm | $fl$ | 5.454 mm | $R1_{21}$ | 11.35702 mm |
| $R1_{31}$ | −5.851768 mm | $R1_{32}$ | −10.86426 mm | $R1_{41}$ | −12.57332 mm |
| $R1_{42}$ | −9.392634 mm | | | | |
| $fl_4/fl$ | 5.06 | $fl_1 + fl_2$ | −1.58 mm | $(fl_4 − fl_3)/fl$ | 9.13 |
| $R1_{21}/R1_{31}$ | −1.94 | $(R1_{31} + R1_{32})/(R1_{31} − R1_{32})$ | −3.33 | $(R1_{31} + R1_{32})/(R1_{41} + R1_{42})$ | 0.76 |

Figure 2A:
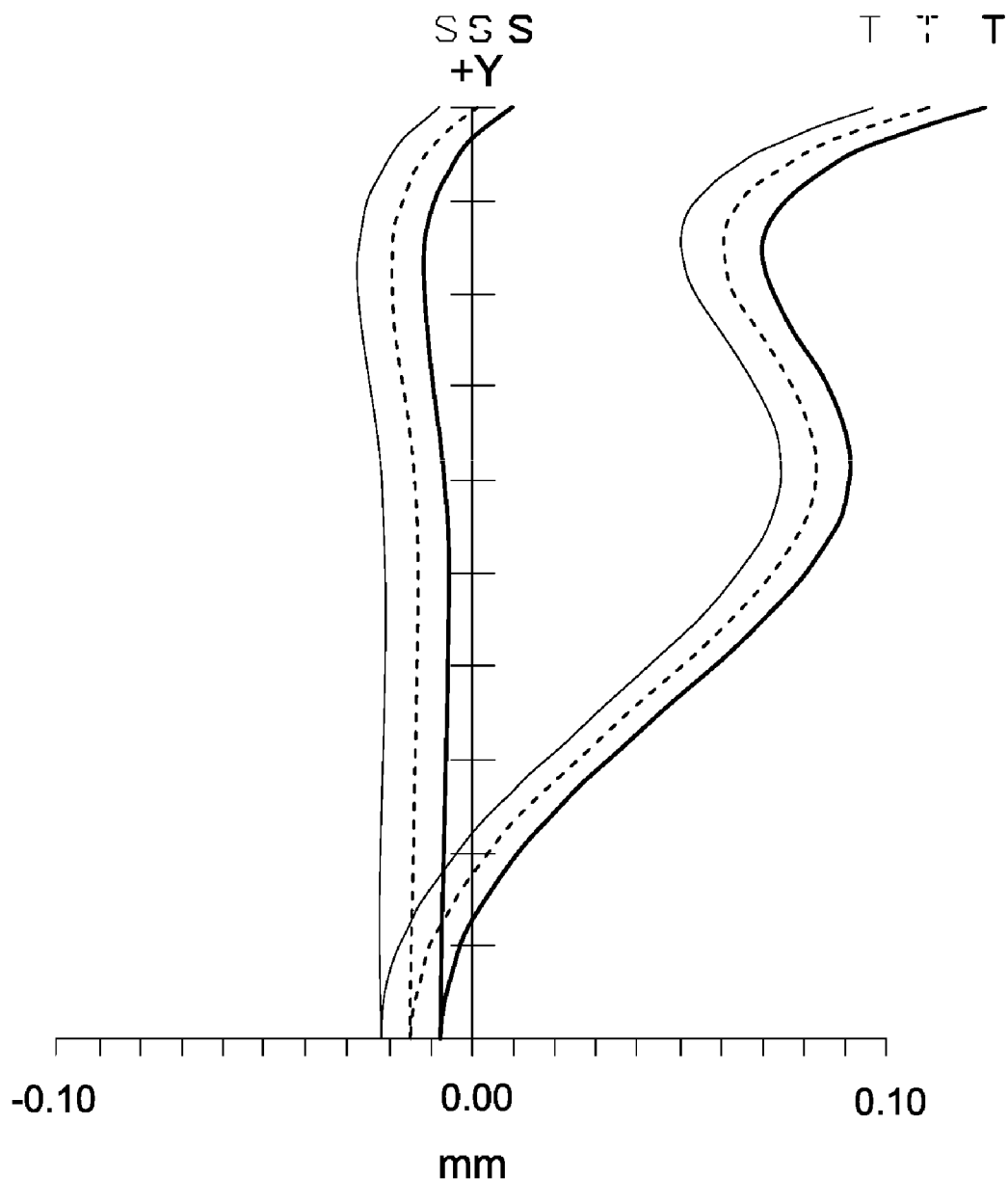
FIG. 2A depicts a field curvature diagram of the lens assembly in accordance with the first embodiment of the invention.
Figure 2B:
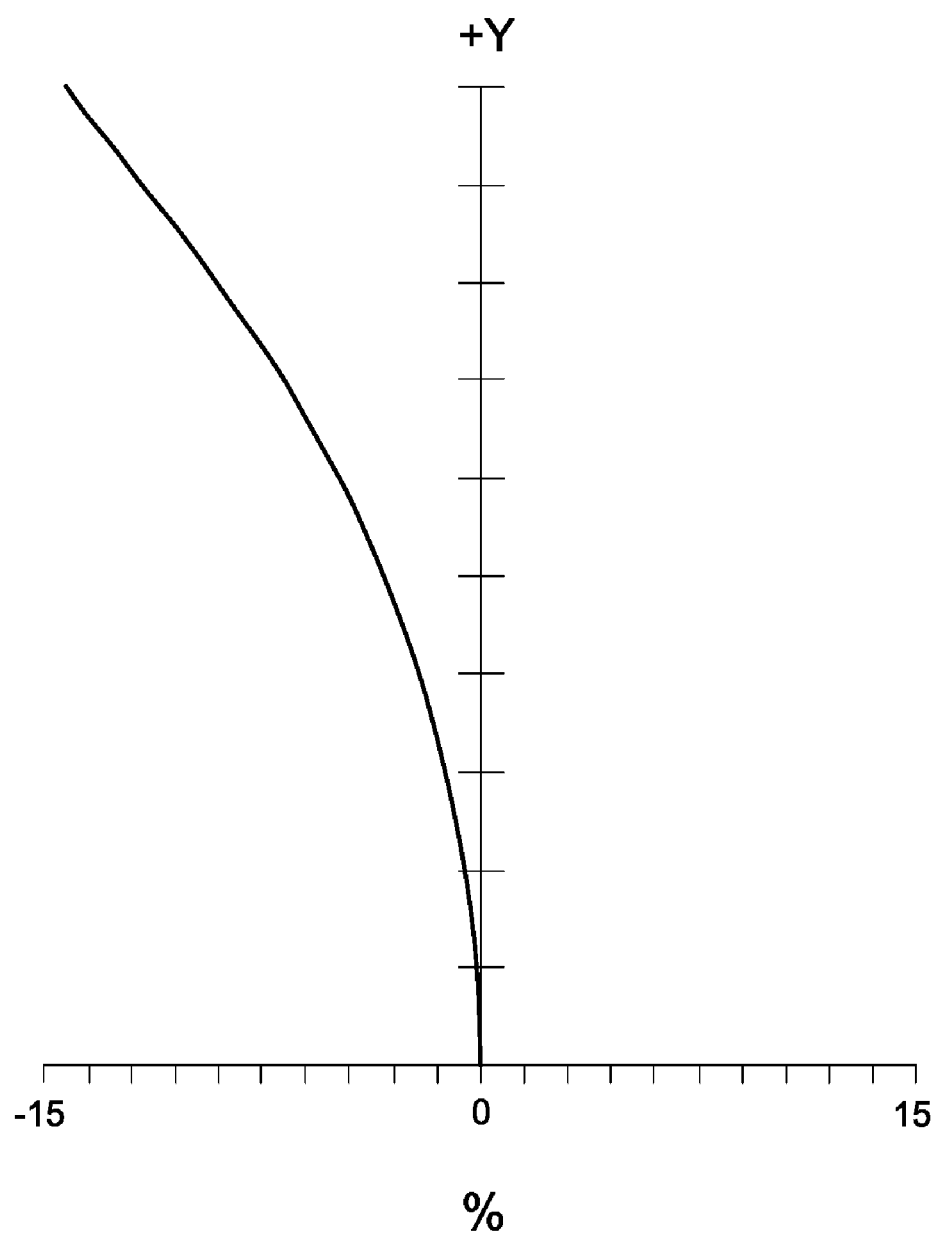
FIG. 2B is a distortion diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a field curvature diagram of the lens assembly 1 in accordance with the first embodiment of the invention, FIG. 2B shows a distortion diagram of the lens assembly 1 in accordance with the first embodiment of the invention, and FIG. 2C shows a modulation transfer function diagram of the lens assembly 1 in accordance with the first embodiment of the invention.

It can be seen from FIG. 2A that the field curvature of tangential direction and sagittal direction in the lens assembly 1 of the first embodiment ranges from −0.03 mm to 0.13 mm for the wavelength of 0.845 μm, 0.860 μm, and 0.875 μm.

It can be seen from FIG. 2B (in which the three lines in the figure almost coincide to appear as if a signal line) that the distortion in the lens assembly 1 of the first embodiment ranges from −15% to 0% for the wavelength of 0.845 μm, 0.860 μm, and 0.875 μm.

It can be seen from FIG. 2C that the modulation transfer function of tangential direction and sagittal direction in the lens assembly 1 of the first embodiment ranges from 0.39 to 1.0 wherein the wavelength ranges from 0.845 μm to 0.875 μm, the fields respectively are 0.00 degree, 16.00 degrees, 28.00 degrees, 32.00 degrees, 36.00 degrees, and 40.00 degrees, and the spatial frequency ranges from 0 lp/mm to 29 lp/mm.

It is obvious that the field curvature and the distortion of the lens assembly 1 of the first embodiment can be corrected effectively, and the resolution of the lens assembly 1 of the first embodiment can meet the requirement. Therefore, the lens assembly 1 of the first embodiment is capable of good optical performance.

Figure 3:
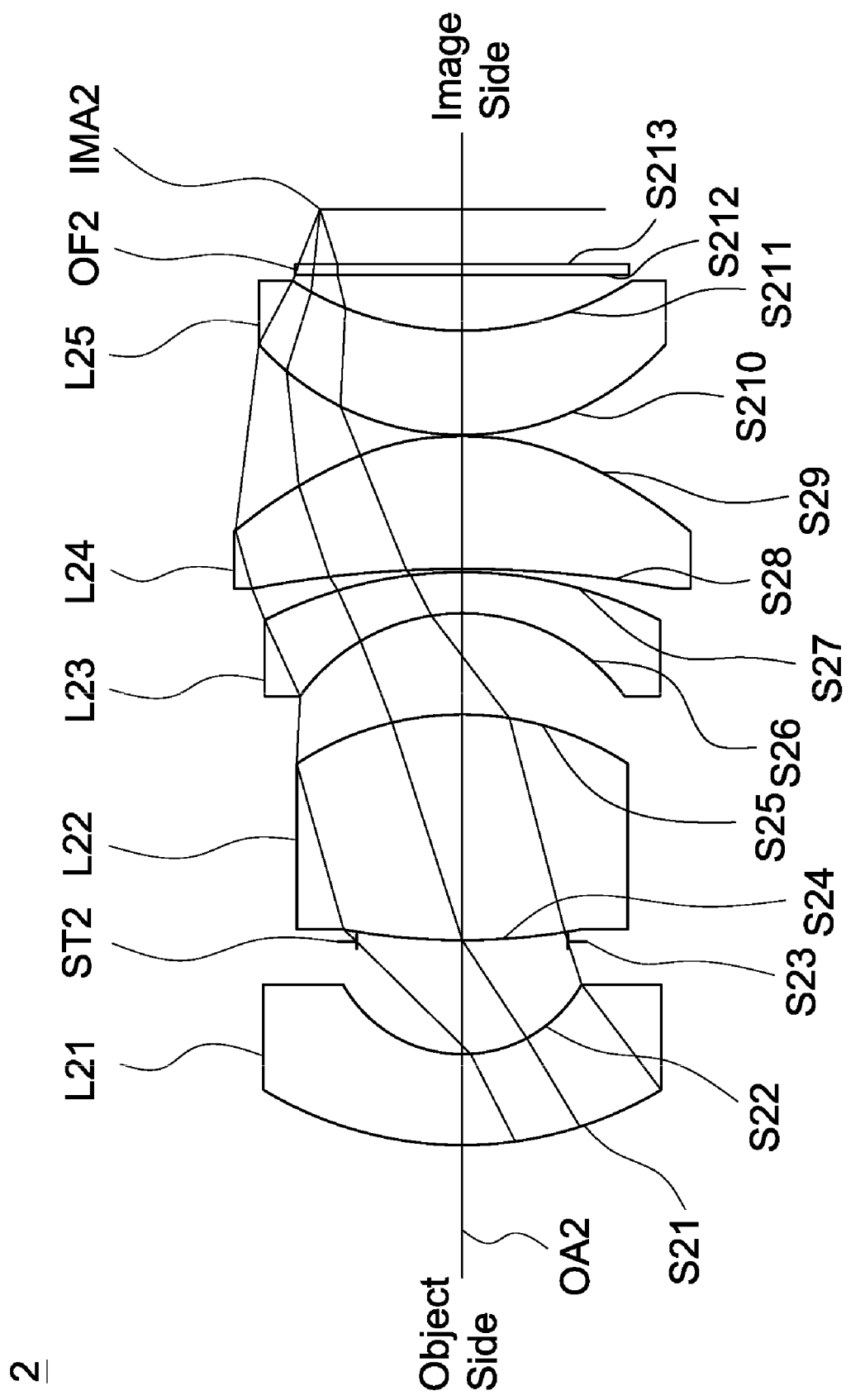
FIG. 3 is a lens layout and optical path diagram of a lens assembly in accordance with a second embodiment of the invention.

Referring to FIG. 3, FIG. 3 is a lens layout and optical path diagram of a lens assembly in accordance with a second embodiment of the invention. The lens assembly 2 includes a first lens L21, a stop ST2, a second lens L22, a third lens L23, a fourth lens L24, a fifth lens L25 and an optical filter OF2, all of which are arranged in order from an object side to an image side along an optical axis OA2. In operation, an image of light rays from the object side is formed at the image plane IMA2.

The first lens L21 is a meniscus lens with negative refractive power and made of glass material, wherein the object side surface S21 is a convex surface, the image side surface S22 is a concave surface, and both of the object side surface S21 and image side surface S22 are spherical surfaces.

The second lens L22 is a biconvex lens with positive refractive power and made of glass material, wherein the object side surface S24 is a convex surface, the image side surface S25 is a convex surface, and both of the object side surface S24 and image side surface S25 are spherical surfaces.

The third lens L23 is a meniscus lens with negative refractive power and made of glass material, wherein the object side surface S26 is a concave surface, the image side surface S27 is a convex surface, and both of the object side surface S26 and image side surface S27 are spherical surfaces.

The fourth lens L24 is a meniscus lens with positive refractive power and made of glass material, wherein the object side surface S28 is a concave surface, the image side surface S29 is a convex surface, and the object side surface S28 is spherical surfaces, the image side surface S29 is aspheric surfaces and without inflection point.

The fifth lens L25 is a meniscus lens with positive refractive power and made of glass material, wherein the object side surface S210 is a convex surface, the image side surface S211 is a concave surface, and both of the object side surface S210 and image side surface S211 are spherical surfaces.

Both of the object side surface S212 and image side surface S213 of the optical filter OF2 are plane surfaces.

In addition, the lens assembly 2 of the second embodiment at least satisfies one of the following conditions:

$$1.7 < f2_4/f2 < 6 \tag{7}$$

$$-3 < f2_1 + f2_2 < -1 \tag{8}$$

$$4 < (f2_4 - f2_3)/f2 < 10 \tag{9}$$

$$-2.9 < R2_{21}/R2_{31} < -1.9 \tag{10}$$

$$-4 < (R2_{31} + R2_{32})/(R2_{31} - R2_{32}) < -2 \tag{11}$$

$$0 < (R2_{31} + R2_{32})/(R2_{41} + R2_{42}) < 1 \tag{12}$$

The definition of $f2_1$, $f2_2$, $f2_3$, $f2_4$, $f2$, $R2_{21}$, $R2_{31}$, $R2_{32}$, $R2_{41}$ and $R2_{42}$ are the same as that of $f1_1$, $f1_2$, $f1_3$, $f1_4$, $f1$, $R1_{21}$, $R1_{31}$, $R1_{32}$, $R1_{41}$ and $R1_{42}$ in the first embodiment, and is not described here again.

By the above design of the lenses and stop ST2, and satisfies at least one of the conditions (7)-(12), the lens assembly 2 is provided with an effective decreased F-number, an effective increased field of view, an effective increased resolution, and an effective corrected aberration.

In order to achieve the above purposes and effectively enhance the optical performance, the lens assembly 2 in accordance with the second embodiment of the invention is provided with the optical specifications shown in Table 4, which include the effective focal length, F-number, total lens length, field of view, radius of curvature of each lens surface, thickness between adjacent surface, refractive index of each lens and Abbe number of each lens. Table 4 shows that the effective focal length is equal to 5.454 mm, F-number is equal to 1.1, total lens length is equal to 26.797 mm, and field of view is equal to 80 degrees for the lens assembly 2 of the second embodiment of the invention.

TABLE 4

| Effective Focal Length = 5.454 mm F-number = 1.1 Total Lens Length = 26.797 mm Field of View = 80 degrees | | | | | |
|---|---|---|---|---|---|
| Surface Number | Radius of Curvature (mm) | Thickness (mm) | Nd | Vd | Remark |
| S21 | 10.51594 | 2.679299 | 1.739000 | 49.040000 | The First Lens L21 |
| S22 | 3.870399 | 3.172502 | | | |
| S23 | ∞ | 0.009654707 | | | Stop ST2 |

TABLE 4-continued

Effective Focal Length = 5.454 mm F-number = 1.1
Total Lens Length = 26.797 mm Field of View = 80 degrees

| Surface Number | Radius of Curvature (mm) | Thickness (mm) | Nd | Vd | Remark |
|---|---|---|---|---|---|
| S24 | 15.96811 | 6.500561 | 1.848090 | 40.400000 | The Second Lens L22 |
| S25 | −8.212552 | 2.880846 | | | |
| S26 | −5.557586 | 1.198348 | 1.665740 | 55.070000 | The Third Lens L23 |
| S27 | −11.55388 | 0.07476489 | | | |
| S28 | −31.62004 | 3.811426 | 1.903700 | 31.310000 | The Fourth Lens L24 |
| S29 | −7.162718 | 0.05 | | | |
| S210 | 7.675441 | 2.971209 | 1.903700 | 31.310000 | The Fifth Lens L25 |
| S211 | 8.784401 | 1.580029 | | | |
| S212 | ∞ | 0.3 | 1.5168 | 64.167336 | Optical Filter OF2 |
| S213 | ∞ | 1.567941 | | | |

The aspheric surface sag z of each lens in Table 4 can be calculated by the following formula:

$$z = ch^2/\{1+[1-(k+1)c^2h^2]^{1/2}\} + Ah^4 \pm Bh^6 + Ch^8 + Dh^{10}$$

where c is curvature, h is the vertical distance from the lens surface to the optical axis, k is conic constant and A, B, C and D are aspheric coefficients.

In the second embodiment, the conic constant k and the aspheric coefficients A, B, C, D of each surface are shown in Table 5.

TABLE 5

| Surface Number | k | A | B | C | D |
|---|---|---|---|---|---|
| S29 | −1.244177 | 0 | 0 | 0 | 0 |

Table 6 shows the parameters and condition values for conditions (7)-(12). As can be seen from Table 6, the lens assembly 2 of the second embodiment satisfies the conditions (7)-(12).

TABLE 6

| | | | | | |
|---|---|---|---|---|---|
| $f2_1$ | −10.0011 mm | $f2_2$ | 7.294643 mm | $f2_3$ | −17.48149 mm |
| $f2_4$ | 9.54139 mm | $f2$ | 5.454 mm | $R2_{21}$ | 15.96811 mm |
| $R2_{31}$ | −5.557586 mm | $R2_{32}$ | −11.55388 mm | $R2_{41}$ | −31.62004 mm |
| $R2_{42}$ | −7.162718 mm | | | | |
| $f2_4/f2$ | 1.75 | $f2_1 + f2_2$ | −2.71 mm | $(f2_4 - f2_3)/f2$ | 4.95 |
| $R2_{21}/R2_{31}$ | −2.87 | $(R2_{31} + R2_{32})/(R2_{31} - R2_{32})$ | −2.85 | $(R2_{31} + R2_{32})/(R2_{41} + R2_{42})$ | 0.44 |

Figure 4A:
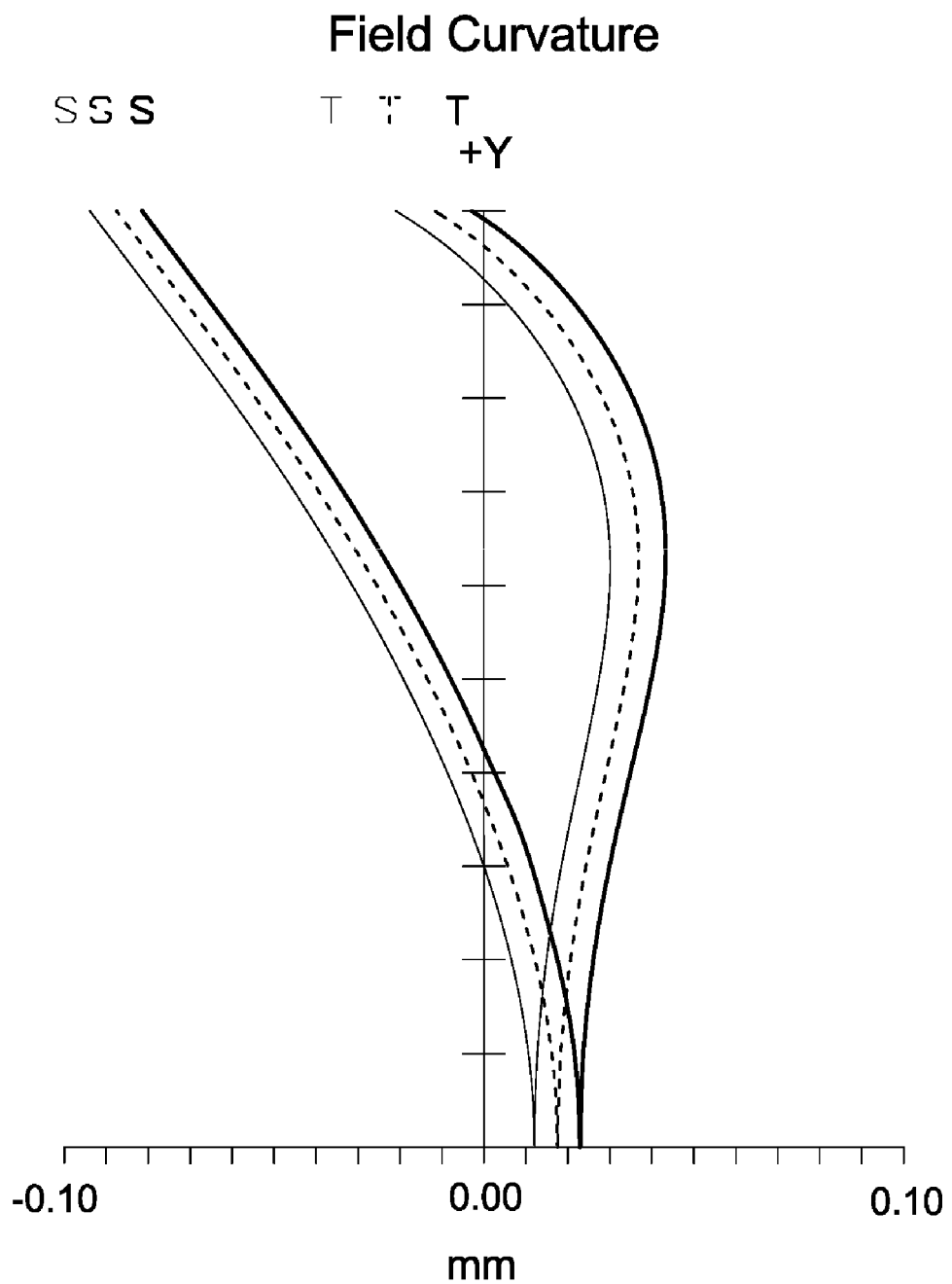
FIG. 4A depicts a field curvature diagram of the lens assembly in accordance with the second embodiment of the invention.
Figure 4B:
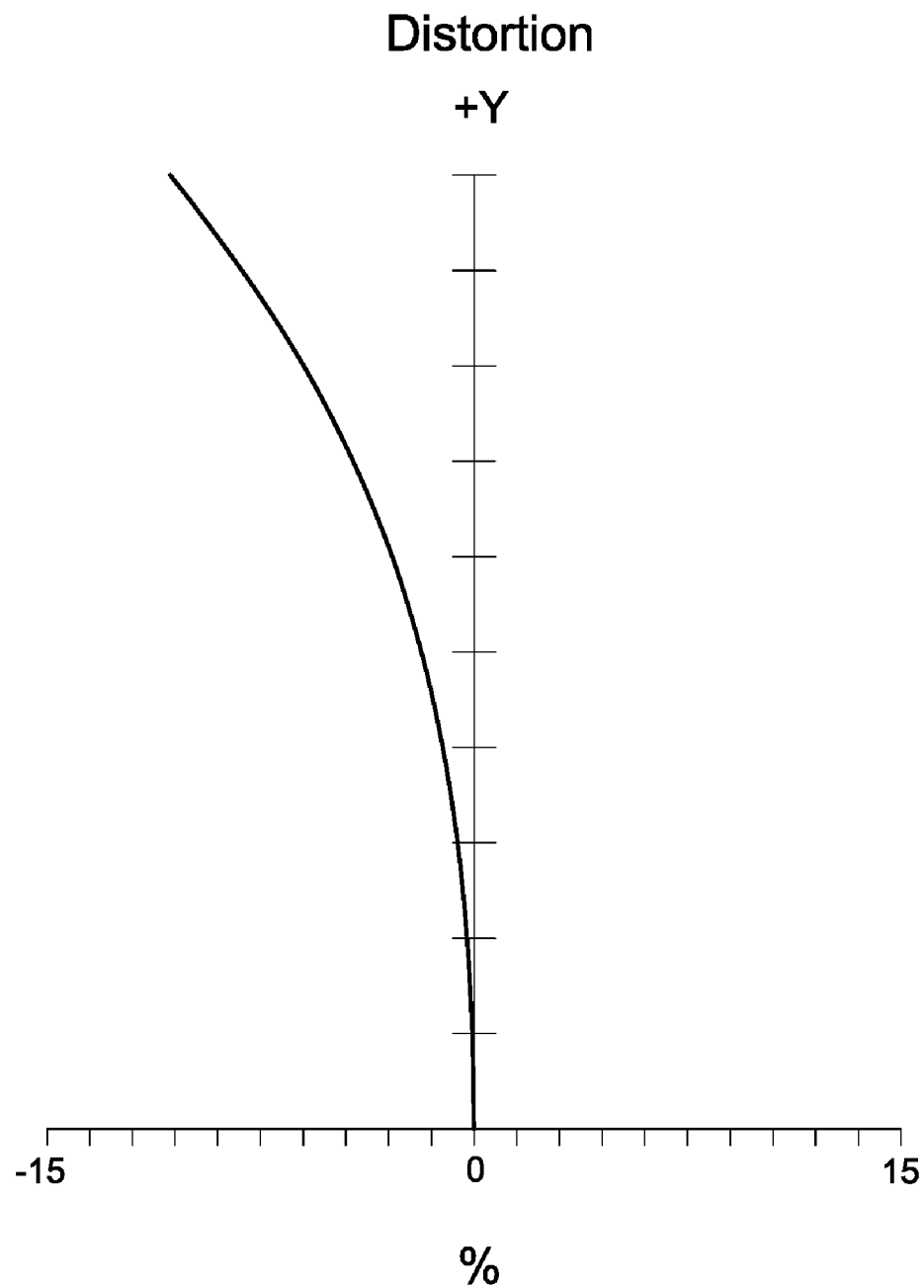
FIG. 4B is a distortion diagram of the lens assembly in accordance with the second embodiment of the invention.
Figure 4C:
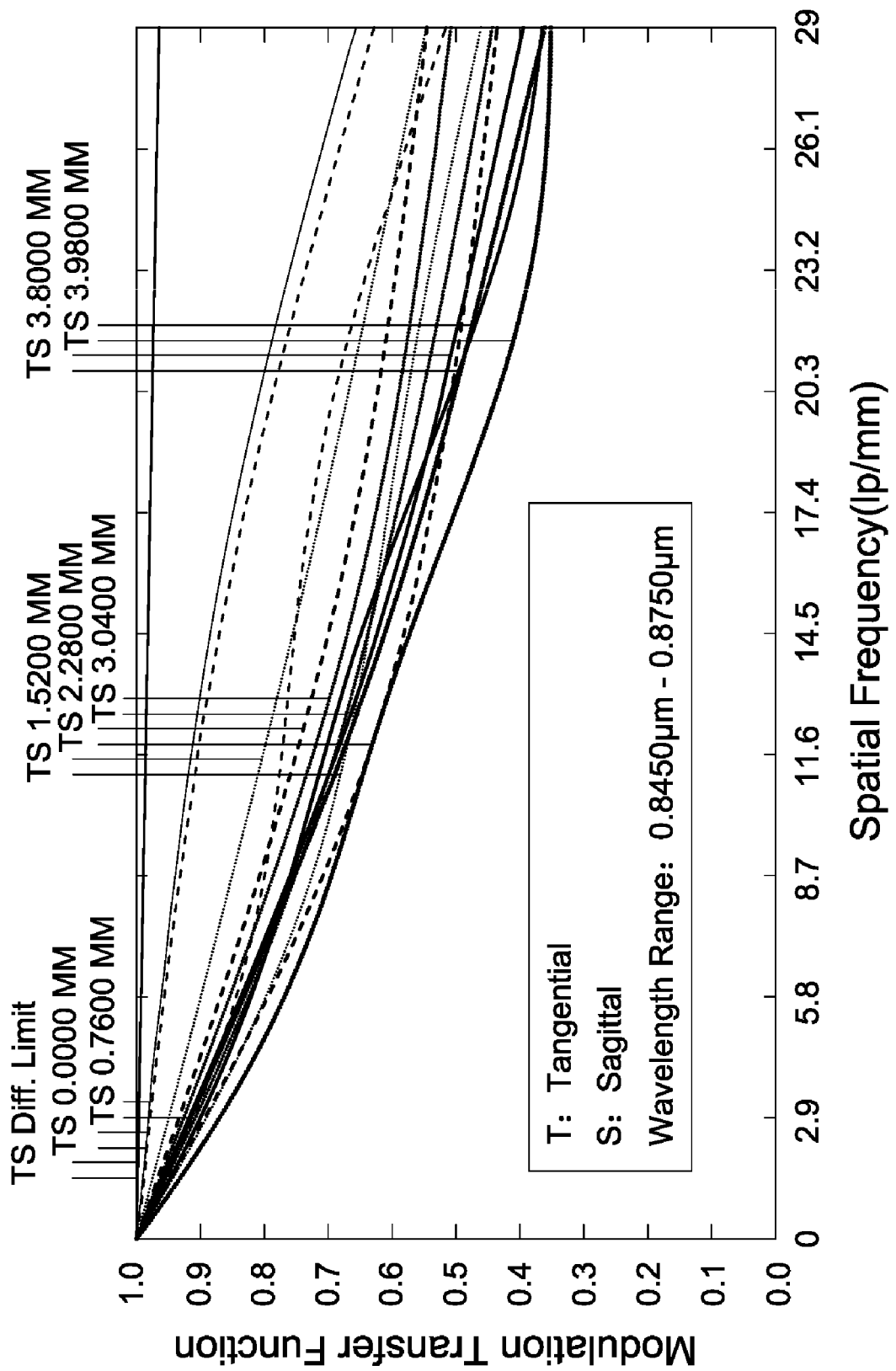
FIG. 4C is a modulation transfer function diagram of the lens assembly in accordance with the second embodiment of the invention.

By the above arrangements of the lenses and stop ST2, the lens assembly 2 of the second embodiment can meet the requirements of optical performance as seen in FIGS. 4A-4C, wherein FIG. 4A shows a field curvature diagram of the lens assembly 2 in accordance with the second embodiment of the invention, FIG. 4B shows a distortion diagram of the lens assembly 2 in accordance with the second embodiment of the invention, and FIG. 4C shows a modulation transfer function diagram of the lens assembly 2 in accordance with the second embodiment of the invention.

It can be seen from FIG. 4A that the field curvature of tangential direction and sagittal direction in the lens assembly 2 of the second embodiment ranges from −0.10 mm to 0.05 mm for the wavelength of 0.845 μm, 0.860 μm, and 0.875 μm.

It can be seen from FIG. 4B (in which the three lines in the figure almost coincide to appear as if a signal line) that the distortion in the lens assembly 2 of the second embodiment ranges from −11% to 0% for the wavelength of 0.845 μm, 0.860 μm, and 0.875 μm.

It can be seen from FIG. 4C that the modulation transfer function of tangential direction and sagittal direction in the lens assembly 2 of the second embodiment ranges from 0.35 to 1.0 wherein the wavelength ranges from 0.845 μm to 0.875 μm, the fields respectively are 0.0000 mm, 0.7600 mm, 1.5200 mm, 2.2800 mm, 3.0400 mm, 3.8000 mm, and 3.9800 mm, and the spatial frequency ranges from 0 lp/mm to 29 lp/mm.

It is obvious that the field curvature and the distortion of the lens assembly 2 of the second embodiment can be corrected effectively, and the resolution of the lens assembly 2 of the second embodiment can meet the requirement. Therefore, the lens assembly 2 of the second embodiment is capable of good optical performance.

Figure 5:
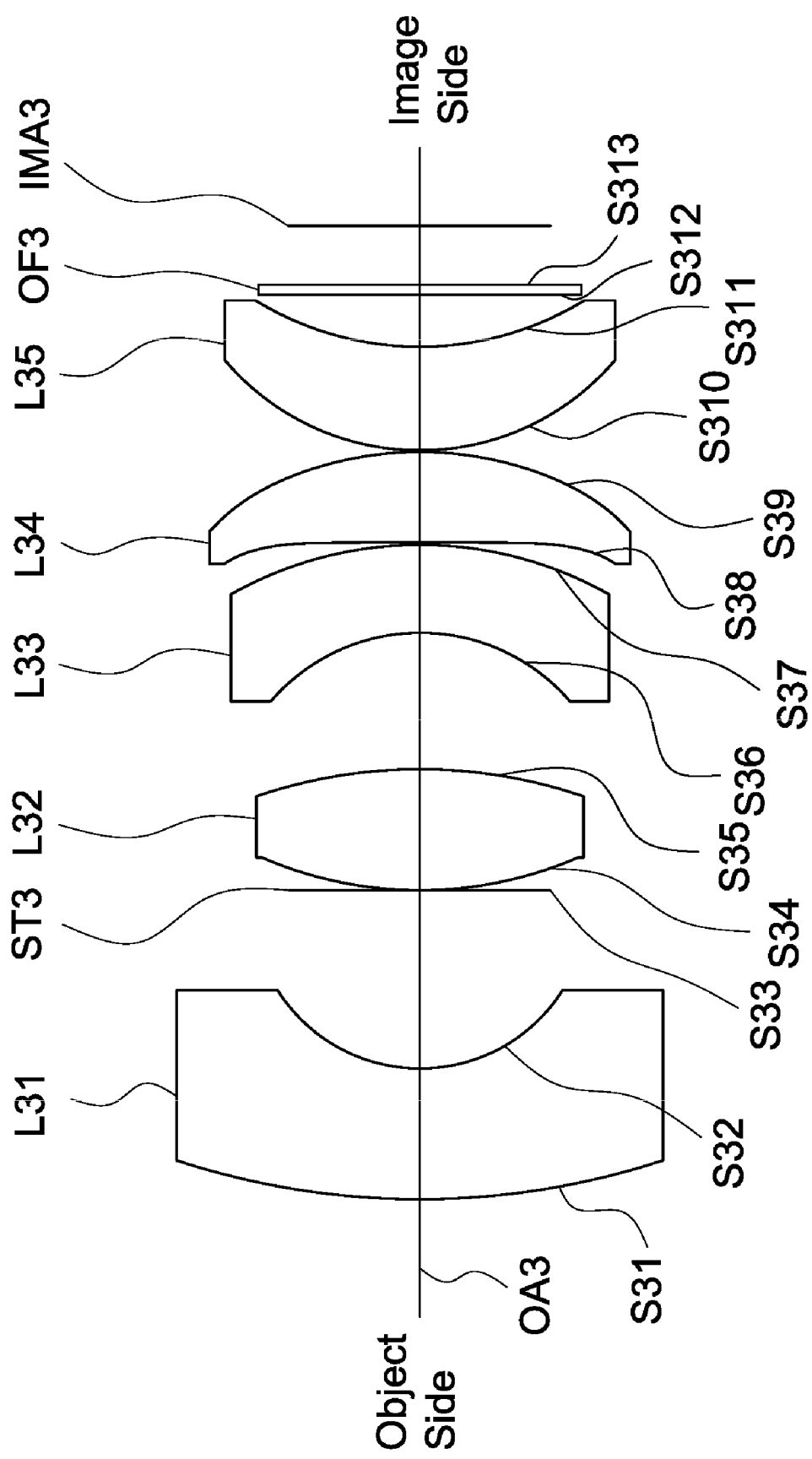
FIG. 5 is a lens layout diagram of a lens assembly in accordance with a third embodiment of the invention.

Referring to FIG. 5, FIG. 5 is a lens layout diagram of a lens assembly in accordance with a third embodiment of the invention. The lens assembly 3 includes a first lens L31, a stop ST3, a second lens L32, a third lens L33, a fourth lens L34, a fifth lens L35 and an optical filter OF3, all of which are arranged in order from an object side to an image side along an optical axis OA3. In operation, an image of light rays from the object side is formed at the image plane IMA3.

The first lens L31 is a meniscus lens with negative refractive power and made of glass material, wherein the object side surface S31 is a convex surface, the image side surface S32 is a concave surface, and both of the object side surface S31 and image side surface S32 are spherical surfaces.

The second lens L32 is a biconvex lens with positive refractive power and made of glass material, wherein the object side surface S34 is a convex surface, the image side surface S35 is a convex surface, and both of the object side surface S34 and image side surface S35 are spherical surfaces.

The third lens L33 is a meniscus lens with negative refractive power and made of glass material, wherein the object side surface S36 is a concave surface, the image side surface S37 is a convex surface, and both of the object side surface S36 and image side surface S37 are spherical surfaces.

The fourth lens L34 is a meniscus lens with positive refractive power and made of glass material, wherein the object side surface S38 is a concave surface, the image side surface S39 is a convex surface, and both of the object side surface S38 and image side surface S39 are aspheric surfaces and without inflection point.

The fifth lens L35 is a meniscus lens with positive refractive power and made of glass material, wherein the object side surface S310 is a convex surface, the image side surface S311 is a concave surface, and both of the object side surface S310 and image side surface S311 are spherical surfaces.

Both of the object side surface S312 and image side surface S313 of the optical filter OF3 are plane surfaces.

In addition, the lens assembly 3 of the third embodiment at least satisfies one of the following conditions:

$$1.7 < f3_4/f3 < 6 \tag{13}$$

$$-3 < f3_1 + f3_2 < -1 \tag{14}$$

$$4 < (f3_4 - f3_3)/f3 < 10 \tag{15}$$

$$-2.9 < R3_{21}/R3_{31} < -1.9 \tag{16}$$

$$-4 < (R3_{31} + R3_{32})/(R3_{31} - R3_{32}) < -2 \tag{17}$$

$$0 < (R3_{31} + R3_{32})/(R3_{41} + R3_{42}) < 1 \tag{18}$$

$$1.8 < (Nd3_1 + Nd3_4)/2 < 1.9 \tag{19}$$

The definition of $f3_1$, $f3_2$, $f3_3$, $f3_4$, $f3$, $R3_{21}$, $R3_{31}$, $R3_{32}$, $R3_{41}$ and $R3_{42}$ are the same as that of $f1_1$, $f1_2$, $f1_3$, $f1_4$, $f1$, $R1_{21}$, $R1_{31}$, $R1_{32}$, $R1_{41}$ and $R1_{42}$ in the first embodiment, and is not described here again. $Nd3_1$ is a refractive index of the first lens L31, $Nd3_4$ is a refractive index of the fourth lens L34.

By the above design of the lenses and stop ST3, and satisfies at least one of the conditions (13)-(19), the lens assembly 3 is provided with an effective decreased F-number, an effective increased field of view, an effective increased resolution, and an effective corrected aberration.

In order to achieve the above purposes and effectively enhance the optical performance, the lens assembly 3 in accordance with the third embodiment of the invention is provided with the optical specifications shown in Table 7, which include the effective focal length, F-number, total lens length, field of view, radius of curvature of each lens surface, thickness between adjacent surface, refractive index of each lens and Abbe number of each lens. Table 7 shows that the effective focal length is equal to 5.412 mm, F-number is equal to 1.05, total lens length is equal to 29.953 mm, and field of view is equal to 80 degrees for the lens assembly 3 of the third embodiment of the invention.

TABLE 7

Effective Focal Length = 5.412 mm F-number = 1.05
Total Lens Length = 29.953 mm Field of View = 80 degrees

| Surface Number | Radius of Curvature (mm) | Thickness (mm) | Nd | Vd | Remark |
|---|---|---|---|---|---|
| S31 | 24.12389 | 4.056794 | 1.739000 | 49.040000 | The First Lens L31 |
| S32 | 5.226206 | 5.442901 | | | |
| S33 | ∞ | 0.009777322 | | | Stop ST3 |
| S34 | 12.23767 | 3.725326 | 1.903700 | 31.310000 | The Second Lens L32 |
| S35 | −15.47996 | 4.197982 | | | |
| S36 | −6.096181 | 2.703948 | 1.739000 | 49.040000 | The Third Lens L33 |
| S37 | −11.85312 | 0.0757144 | | | |
| S38 | −189.0157 | 2.786752 | 1.903700 | 31.310000 | The Fourth Lens L34 |
| S39 | −9.765661 | 0.050635 | | | |
| S310 | 7.850452 | 3.187142 | 1.903700 | 31.310000 | The Fifth Lens L35 |
| S311 | 9.63756 | 1.600095 | | | |
| S312 | ∞ | 0.30381 | 1.5168 | 64.167336 | Optical Filter OF3 |
| S313 | ∞ | 1.812551 | | | |

The aspheric surface sag z of each lens in Table 7 can be calculated by the following formula:

$$z = ch^2/\{1 + [1 - (k+1)c^2h^2]^{1/2}\} \pm Ah^4 \pm Bh^6 + Ch^8 + Dh^{10}$$

where c is curvature, h is the vertical distance from the lens surface to the optical axis, k is conic constant and A, B, C and D are aspheric coefficients.

In the third embodiment, the conic constant k and the aspheric coefficients A, B, C, D of each surface are shown in Table 8.

TABLE 8

| Surface Number | k | A | B | C | D |
|---|---|---|---|---|---|
| S38 | 0 | 0.0044249916 | −0.00033479106 | 2.7572103e−006 | −2.4084822e−007 |
| S39 | 0 | 0.0043522203 | −7.4974328e−005 | 1.8227344e−007 | −1.2602616e−007 |

Table 9 shows the parameters and condition values for conditions (13)-(19). As can be seen from Table 9, the lens assembly 3 of the third embodiment satisfies the conditions (13)-(19).

TABLE 9

| | | | | | |
|---|---|---|---|---|---|
| $f3_1$ | −9.93402 mm | $f3_2$ | 8.078309 mm | $f3_3$ | −21.21999 mm |
| $f3_4$ | 11.3116 mm | $f3$ | 5.412 mm | $R3_{21}$ | 12.23767 mm |
| $R3_{31}$ | −6.096181 mm | $R3_{32}$ | −11.85312 mm | $R3_{41}$ | −189.0157 mm |
| $R3_{42}$ | −9.765661 mm | $Nd3_1$ | 1.739000 | $Nd3_4$ | 1.903700 |
| $f3_4/f3$ | 2.09 | $f3_1 + f3_2$ | −1.86 mm | $(f3_4 - f3_3)/f3$ | 6.01 |
| $R3_{21}/R3_{31}$ | −2.01 | $(R3_{31} + R3_{32})/(R3_{31} - R3_{32})$ | −3.12 | $(R3_{31} + R3_{32})/(R3_{41} + R3_{42})$ | 0.09 |
| $(Nd3_1 + Nd3_4)/2$ | 1.82135 | | | | |

Figure 6B:
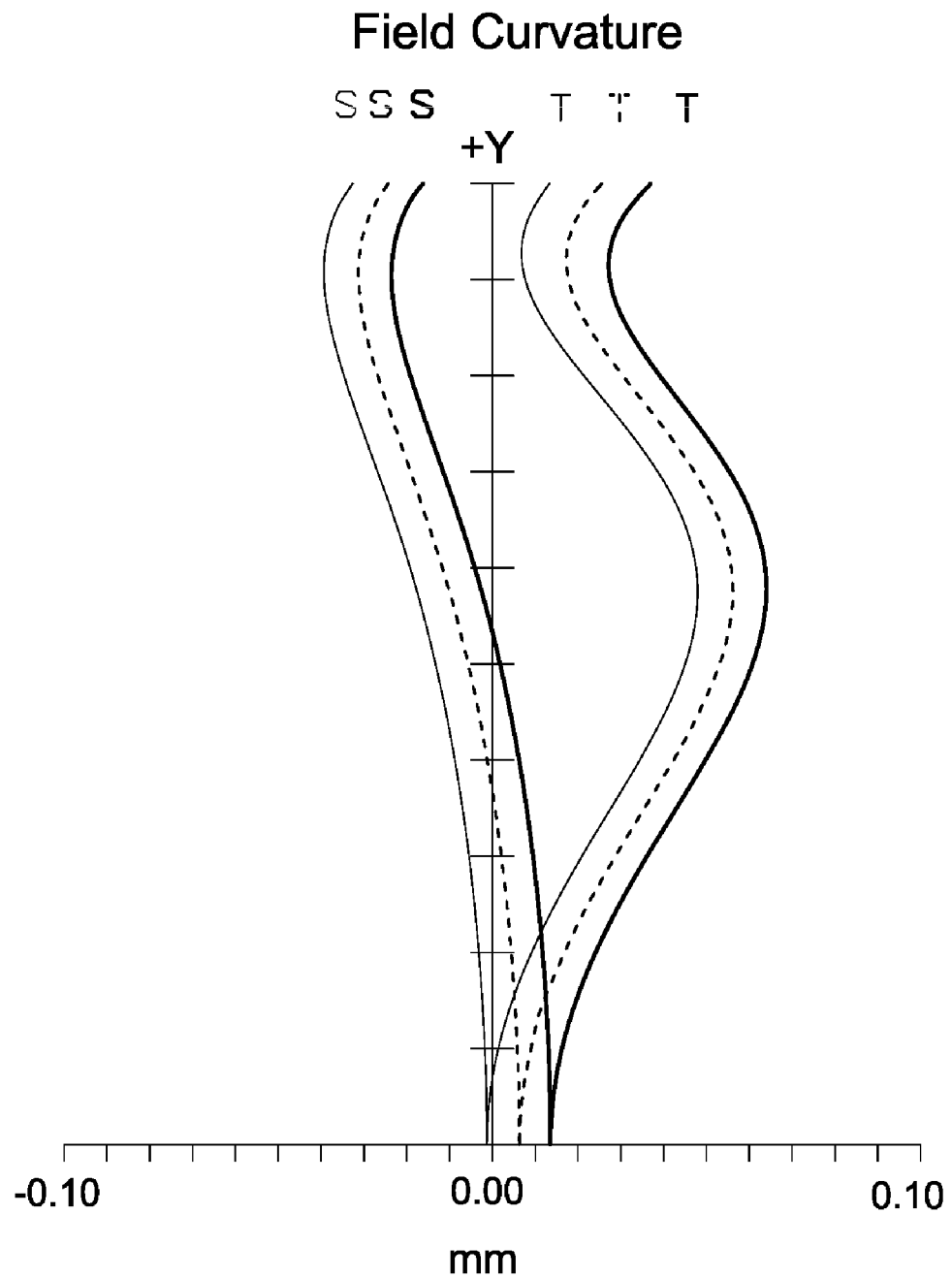
FIG. 6B is a field curvature diagram of the lens assembly in accordance with the third embodiment of the invention.
Figure 6C:
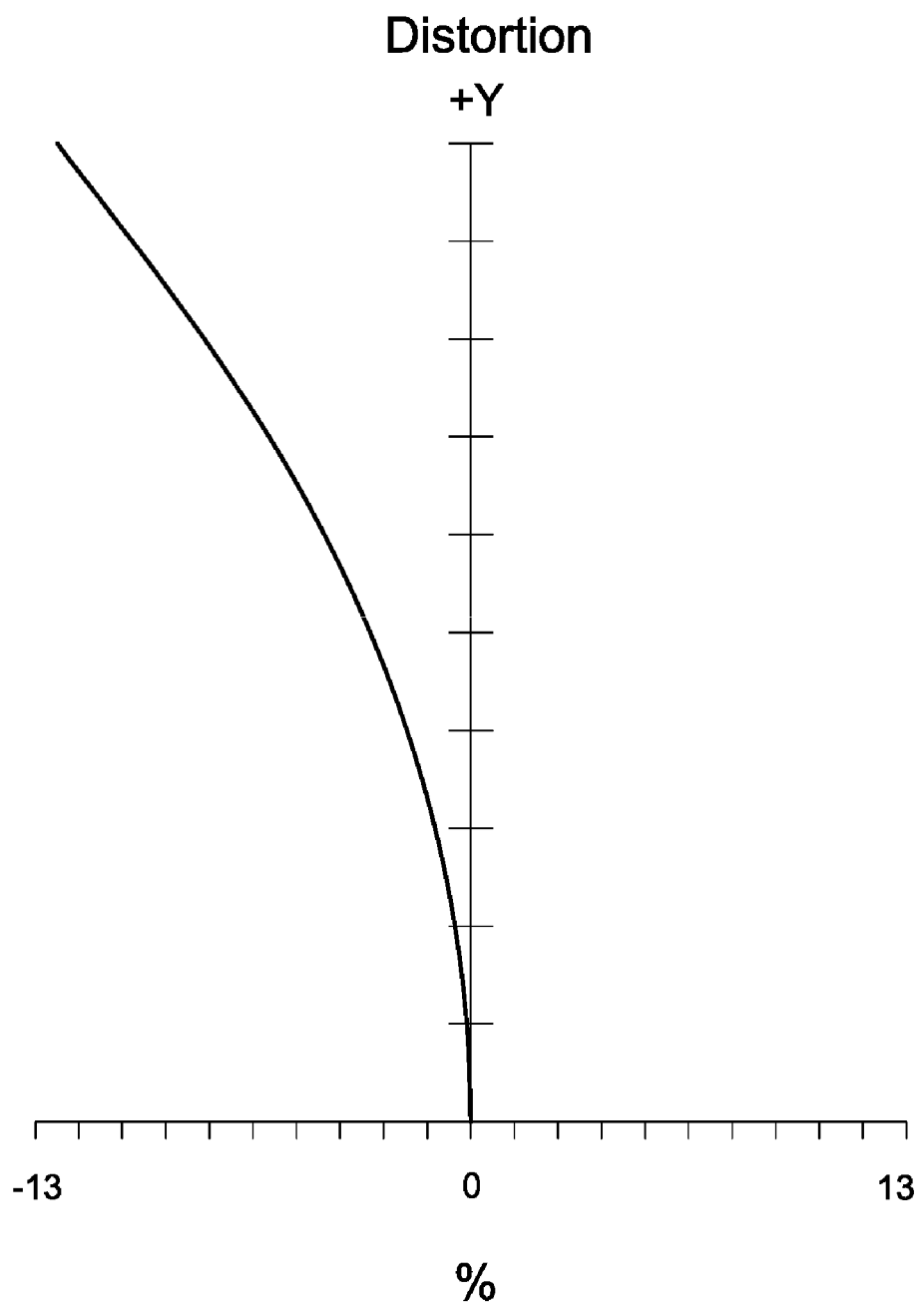
FIG. 6C is a distortion diagram of the lens assembly in accordance with the third embodiment of the invention.
Figure 6E:
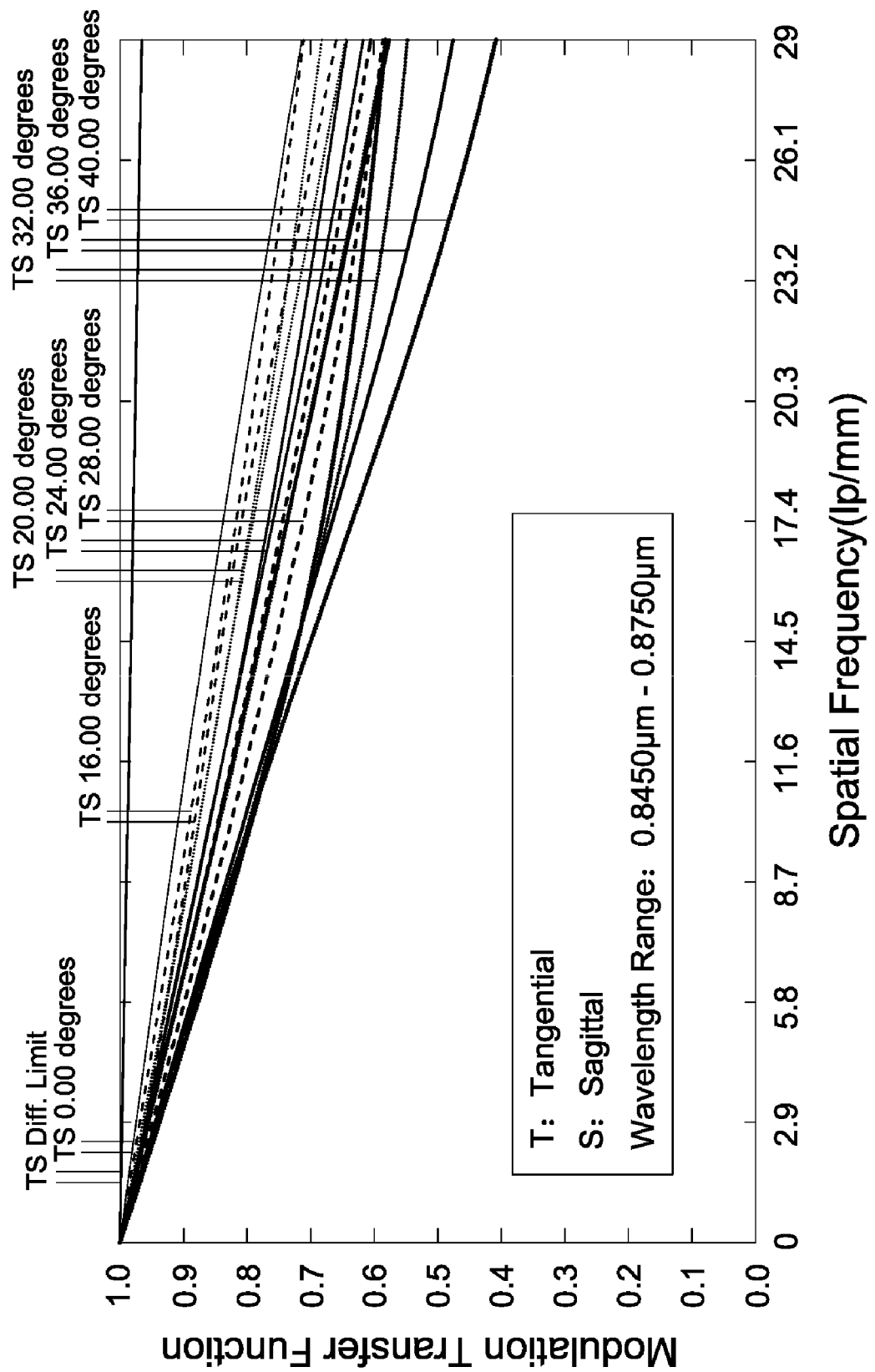
FIG. 6E is a modulation transfer function diagram of the lens assembly in accordance with the third embodiment of the invention.

By the above arrangements of the lenses and stop ST3, the lens assembly 3 of the third embodiment can meet the requirements of optical performance as seen in FIGS. 6A-6E, wherein FIG. 6A shows a longitudinal aberration diagram of the lens assembly 3 in accordance with the third embodiment of the invention, 6B shows a field curvature diagram of the lens assembly 3 in accordance with the third embodiment of the invention, FIG. 6C shows a distortion diagram of the lens assembly 3 in accordance with the third embodiment of the invention, FIG. 6D shows a lateral color diagram of the lens assembly 3 in accordance with the third embodiment of the invention, and FIG. 6E shows a modulation transfer function diagram of the lens assembly 3 in accordance with the third embodiment of the invention.

It can be seen from FIG. 6A that the longitudinal aberration in the lens assembly 3 of the third embodiment ranges from −0.09 mm to 0.03 mm for the wavelength of 0.845 μm, 0.860 μm, and 0.875 μm.

It can be seen from FIG. 6B that the field curvature of tangential direction and sagittal direction in the lens assembly 3 of the third embodiment ranges from −0.04 mm to 0.07 mm for the wavelength of 0.845 μm, 0.860 μm, and 0.875 μm.

It can be seen from FIG. 6C (in which the three lines in the figure almost coincide to appear as if a signal line) that the distortion in the lens assembly 3 of the third embodiment ranges from −13% to 0% for the wavelength of 0.845 μm, 0.860 μm, and 0.875 μm.

It can be seen from FIG. 6D that the lateral color in the lens assembly 3 of the third embodiment ranges from −4 μm to 4 μm for the wavelength of 0.845 μm, 0.860 μm, and 0.875 μm, and the field ranged from 0 degree to 40.0000 degrees.

It can be seen from FIG. 6E that the modulation transfer function of tangential direction and sagittal direction in the lens assembly 3 of the third embodiment ranges from 0.41 to 1.0 wherein the wavelength ranges from 0.845 μm to 0.875 μm, the fields respectively are 0.00 degree, 16.00 degrees, 20.00 degrees, 24.00 degrees, 28.00 degrees, 32.00 degrees, 36.00 degrees and 40.00 degrees, and the spatial frequency ranges from 0 lp/mm to 29 lp/mm.

It is obvious that the longitudinal aberration, field curvature, the distortion and the lateral color of the lens assembly 3 of the third embodiment can be corrected effectively, and the resolution of the lens assembly 3 of the third embodiment can meet the requirement. Therefore, the lens assembly 3 of the third embodiment is capable of good optical performance.

In the above embodiments, both of the object side surface S18, S38 and image side surface S19, S29, S39 are aspheric surfaces and without inflection point of the fourth lens L14, L24, L34. The aspheric surfaces can decrease spherical aberration or the other aberration, the radius of curvature of aspheric surfaces is change with the center axis, it can maintain the excellent aberration correction by the better radius of curvature. The aspheric surfaces can also reduce the total amount of the lens system, and provide the lens assembly with characteristics of effective decreased F-number, an effective increased field of view, an effective increased resolution, and an effective corrected aberration.

In the above embodiments, the refractive index Nd of the lens in the lens assembly ranges from 1.665740 to 1.903700, the Abbe number Vd of the lens in the lens assembly ranges from 31.005320 to 55.070000. The average value of refractive index of the first lens and the fourth lens $(Nd_1+Nd_4)/2$ ranges from 1.8 to 1.9, wherein the better range of the $(Nd_1+Nd_4)/2$ is from 1.82135 to 1.8229485. The average value of Abbe number of the first lens and the fourth lens $(Vd_1+Vd_4)/2$ ranges from 40 to 41, wherein the better range of the $(Vd_1+Vd_4)/2$ is from 40.150449 to 40.175. The lens assembly can obtain good imaging effect by the range configuration of refractive index and Abbe number.

In the above embodiments, all of the lenses are made of glass material. However, it has the same effect and falls into the scope of the invention that a part or all of the lenses are made of plastic material.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly, comprising sequentially from an object side to an image side along an optical axis:
    a first lens with negative refractive power;
    a second lens with positive refractive power;
    a third lens with negative refractive power including a convex surface facing the image side;
    a fourth lens with positive refractive power including a concave surface facing the object side;
    a fifth lens with positive refractive power including a concave surface facing the image side;
    wherein the lens assembly satisfies:

$1.7 < f_4/f < 6$, wherein $f_4$ is an effective focal length of the fourth lens and f is an effective focal length of the lens assembly.

2. The lens assembly as claimed in claim 1, wherein the third lens further comprises a concave surface facing the object side and the fourth lens further comprises a convex surface facing the image side.

3. The lens assembly as claimed in claim 2, wherein the lens assembly satisfies:

$-4 < (R_{31}+R_{32})/(R_{31}-R_{32}) < -2$, wherein $R_{31}$ is a radius of curvature of the object side surface of the third lens and $R_{32}$ is a radius of curvature of the image side surface of the third lens.

4. The lens assembly as claimed in claim 3, wherein the lens assembly satisfies:

$$0<(R_{31}+R_{32})/(R_{41}+R_{42})<1$$

wherein $R_{31}$ is a radius of curvature of the object side surface of the third lens, $R_{32}$ is a radius of curvature of the image side surface of the third lens, $R_{41}$ is a radius of curvature of the object side surface of the fourth lens, and $R_{42}$ is a radius of curvature of the image side surface of the fourth lens.

5. The lens assembly as claimed in claim 2, wherein the fourth lens is an aspheric lens and without inflection point.

6. The lens assembly as claimed in claim 1, further comprising a stop disposed between the first lens and the second lens, wherein the first lens comprises a convex surface facing the object side and a concave surface facing the image side, the second lens is a biconvex lens, and the fifth lens further comprises a convex surface facing the object side.

7. The lens assembly as claimed in claim 6, wherein the lens assembly satisfies:

$$1.8<(Nd_1+Nd_4)/2<1.9,$$

wherein $Nd_1$ is a refractive index of the first lens and $Nd_4$ is a refractive index of the fourth lens.

8. The lens assembly as claimed in claim 1, wherein the lens assembly satisfies:

$$-3<f_1+f_2<-1,$$

$$-2.9<R_{21}/R_{31}<-1.9,$$

wherein $f_1$ is an effective focal length of the first lens, $f_2$ is an effective focal length of the second lens, $R_{21}$ is a radius of curvature of the object side surface of the second lens and $R_{31}$ is a radius of curvature of the object side surface of the third lens.

9. The lens assembly as claimed in claim 1, wherein the lens assembly satisfies:

$$4<(f_4-f_3)/f<10,$$

wherein $f_3$ is an effective focal length of the third lens, $f_4$ is an effective focal length of the fourth lens, and f is an effective focal length of the lens assembly.

10. A lens assembly, comprising sequentially from an object side to an image side along an optical axis:
   a first lens with negative refractive power;
   a second lens with positive refractive power;
   a third lens with negative refractive power;
   a fourth lens with positive refractive power including a concave surface facing the object side;
   a fifth lens with positive refractive power including a concave surface facing the image side;
   wherein the lens assembly satisfies at least one of the following conditions:

$$4<(f_4-f_3)/f<10, -3<f_1+f_2<-1$$

wherein $f_1$ is an effective focal length of the first lens, $f_2$ is an effective focal length of the second lens, $f_3$ is an effective focal length of the third lens, $f_4$ is an effective focal length of the fourth lens, and f is an effective focal length of the lens assembly.

11. The lens assembly as claimed in claim 10, wherein the third lens comprises a concave surface facing the object side and a convex surface facing the image side, the fourth lens further comprises a convex surface facing the image side, and the fifth lens further comprises a convex surface facing the object side.

12. The lens assembly as claimed in claim 11, wherein the fourth lens is an aspheric lens and without inflection point.

13. The lens assembly as claimed in claim 11, further comprising a stop disposed between the first lens and the second lens, wherein the first lens comprises a convex surface facing the object side and a concave surface facing the image side, and the second lens is a biconvex lens.

14. The lens assembly as claimed in claim 10, wherein the lens assembly satisfies:

$$-4<(R_{31}+R_{32})/(R_{31}-R_{32})<-2,$$

wherein $R_{31}$ is a radius of curvature of the object side surface of the third lens and $R_{32}$ is a radius of curvature of the image side surface of the third lens.

15. The lens assembly as claimed in claim 14, wherein the lens assembly satisfies:

$$0<(R_{31}+R_{32})/(R_{41}+R_{42})<1,$$

wherein $R_{31}$ is a radius of curvature of the object side surface of the third lens, $R_{32}$ is a radius of curvature of the image side surface of the third lens, $R_{41}$ is a radius of curvature of the object side surface of the fourth lens, and $R_{42}$ is a radius of curvature of the image side surface of the fourth lens.

16. The lens assembly as claimed in claim 10, wherein the lens assembly satisfies:

$$1.8<(Nd_1+Nd_4)/2<1.9,$$

wherein $Nd_1$ is a refractive index of the first lens and $Nd_4$ is a refractive index of the fourth lens.

17. The lens assembly as claimed in claim 16, wherein the lens assembly satisfies:

$$1.7<f_4/f<6,$$

wherein $f_4$ is an effective focal length of the fourth lens and f is an effective focal length of the lens assembly.

18. The lens assembly as claimed in claim 10, wherein the lens assembly satisfies:

$$-2.9<R_{21}/R_{31}<-1.9,$$

wherein $R_{21}$ is a radius of curvature of the object side surface of the second lens and $R_{31}$ is a radius of curvature of the object side surface of the third lens.

* * * * *